United States Patent [19]

Pandya

[11] 3,726,313
[45] Apr. 10, 1973

[54] RECIPROCATING VALVE
[75] Inventor: Vidyut K. Pandya, Rockford, Ill.
[73] Assignee: Aquamatic, Inc., Rockford, Ill.
[22] Filed: July 6, 1971
[21] Appl. No.: 159,737

[52] U.S. Cl.................................137/609, 251/DIG. 2
[51] Int. Cl............................................F16k 11/14
[58] Field of Search..................137/625.42, DIG. 2, 137/609

[56] References Cited

UNITED STATES PATENTS 2,784,740  3/1957  Stageberg...................137/625.42 X
3,334,656  8/1967  Boyle..............................251/DIG. 2
3,259,142  7/1966  Richards........................251/DIG. 2

FOREIGN PATENTS OR APPLICATIONS 874,197  8/1961  Great Britain..................251/DIG. 2
897,639  11/1953  Germany........................251/DIG. 2

Primary Examiner—Samuel Scott
Attorney—Marsbach, Pillote & Muir

[57] ABSTRACT

The principles of a roller-band device are applied to a valve. The valve has outlet openings nearly as large as the width of the band. A grid is provided in the outlet openings to support the and when closed. The grid is recessed and a peripheral recess is provided around the outlet openings. The recess has a sharp edge against which the band seals.

32 Claims, 5 Drawing Figures

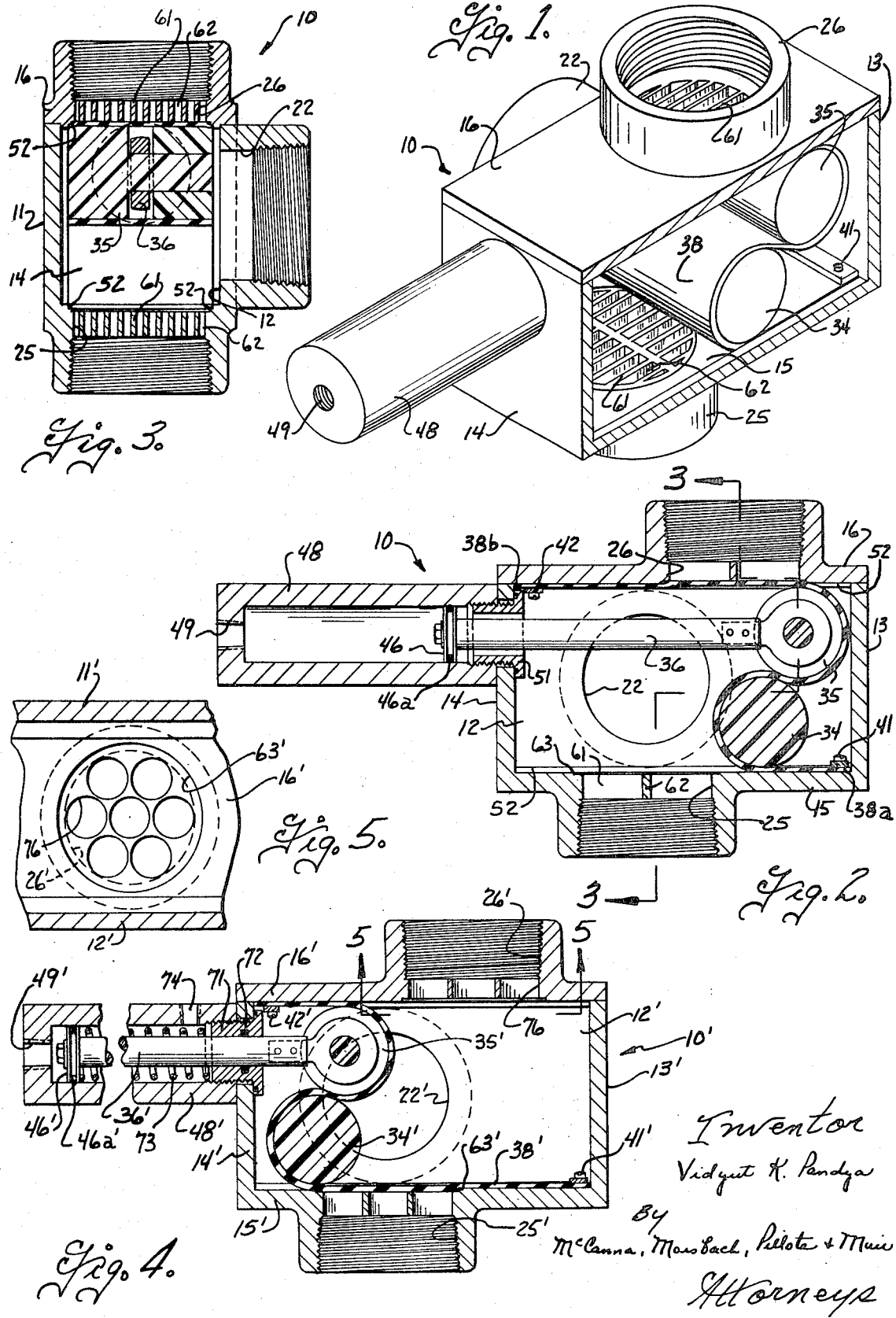

RECIPROCATING VALVE

BACKGROUND

The invention pertains generally to the art of valves and valve actuation and more particularly to a reciprocating valve.

Present globe valves and gate valves are quite large in comparison to the size of the line for which they are designed. This is even more apparent in a three-way valve. It is desirable that a valve be as small as possible in relation to the size of the line. Diaphragm valves are frequently more compact, but their flow characteristics are not as good as gate valves, for example. It is desirable that a valve have as low flow resistance as possible. Valves are susceptible to wear, especially if any dirt is present, and usually must be manufactured to rather accurate tolerances. It is desirable that these factors be minimized.

SUMMARY

The present invention relates to improvements in valves and reciprocating valves.

It is a general object of the invention to provide a valve which is rather compact and which has good flow characteristics.

Another object is to provide a valve which is not susceptible to wear and has very low friction.

Still another object is to provide a valve which is relatively inexpensive to produce and demands no precise tolerances.

Yet another object is to apply the above objects to a three-way valve.

The above objects and other related objects are achieved by applying certain features of a roller band device to a valve. A roller band device or Rolamite is a recently developed mechanical force-translation device. Such devices are shown, for example, in U. S. Pat. Nos. 3,452,175 and 3,452,309 both issued June 24, 1969 to D. F. Wilkes; U. S. Pat. No. 3,471,668 issued Oct. 7, 1969 to D. F. Wilkes; and U. S. Pat. No. 3,572,141 issued Mar. 23, 1971 to D. F. Wilkes. Generally, the roller band device may include a pair of roller members with parallel axes in combination with a flexible band disposed in an S-configuration which separates the rollers while looping around one side of each of the rollers. The assembly is located between guideways and the band is tensioned and its ends anchored. The roller band unit was developed for miniaturization and a wide variety of uses has been suggested. Suggested uses include a thermostat, pivot, bearing, speed reducer, snap-action switch, miniature valve, shock absorber, damper, relay, and piston. The roller band device has low friction characteristics, needs no lubrication in service, is inexpensive to produce, requires no precise tolerances, and is relatively insensitive to dirt.

As stated above, it has been suggested that a roller band device can be utilized in a miniature valve. The present invention adapts certain features of the roller band device to valves of standard sizes, and adds improvements which accomplish the objects of the invention.

The stated objects, and other objects and advantages of the present invention, will become apparent as the invention becomes better understood from the following description when taken in conjunction with the drawings.

DRAWINGS

FIG. 1 is a perspective view of one embodiment of a valve constructed in accordance with the present invention and having the front wall removed for illustration of the relationship of the parts;

FIG. 2 is a longitudinal section through the valve of FIG. 1;

FIG. 3 is a cross-sectional view taken generally along line 3—3 of FIG. 2;

FIG. 4 is a longitudinal section through a second embodiment of the invention and showing the roller band assembly in a moved position; and FIG. 5 is a sectional view taken along line 5—5 of FIG. 4.

DESCRIPTION

Reference is now made more particularly to the drawings which illustrate the best presently known mode of carrying out the invention and wherein similar reference characters indicate the same parts throughout the several views.

The valve 10 includes a hollow valve body formed by front wall 11, rear wall 12, end walls 13 and 14, a bottom wall 15, and a top wall 16. In the embodiment illustrated, the inner surfaces of the bottom wall 15 and top wall 16 define opposed longitudinal guideways which are parallel to each other. An inlet port 22 communicates with the hollow valve body through the rear wall 12. A first outlet port 25 communicates with the hollow body through the bottom wall 15 and thus through the guideway defined by the bottom wall. Similarly, a second outlet port 26 communicates with the hollow valve body through the top wall 16 and thus through the guideway defined by the top wall. With two outlet ports, the valve is adapted to be utilized as a three-way valve. However, the top wall 16 can be replaced by a solid top wall and the valve utilized as a two-way valve.

Within the hollow valve body of the valve 10 are mounted a pair of cylindrical rollers 34 and 35. The rollers are advantageously formed of modified polyphenylene oxide. As best seen in FIGS. 2 and 3, roller 35 is split in the middle to provide for connection to a shift rod 36.

A flexible resilient band 38, formed of reinforced rubber, is looped around each of the rollers 34 and 35 in an S-type configuration. One end 38a is anchored to the bottom wall 15 as by a fastener 41. Likewise, the opposite end 38b is anchored to the top wall 16 as by fastener 42. The band 38 is preferably tensioned and the guideways provide support for the band as the roller members 34 and 35 bear outwardly against the band 38. The roller members 34 and 35 are constrained by the band and roll in the longitudinal direction only. It will be understood that the rollers move in the longitudinal direction when the shift rod 36 is moved.

A piston 46 is secured to the outer end of the shift rod 36. The piston 46 is disposed in a longitudinally extending chamber formed by longitudinal extension 48. While the piston 46 may be of different forms, it is herein shown as including an O-ring 46a for sealing against the inside of the chamber. In the embodiment of FIGS. 1–3, the extension 48 is mounted on the valve body by means of a threaded sleeve 51 which has an opening therethrough greater than the size of the shift rod 36 to expose one side of the piston to the pressurized fluid from the hollow valve body. Thus, the pressurized fluid from the hollow valve body will tend to move the piston to the left and shift the roller band assembly to close outlet port 25 and open outlet port 26. An opening 49 at the outer extremity of the extension 48 may be connected to a source of fluid pressure which is greater than the pressure in the hollow valve body. By selectively applying this greater pressure through port 49, the piston will move to the right as shown in FIG. 2 and the roller band assembly will assume the position illustrated in FIG. 2 which closes outlet port 26 and opens outlet port 25.

Since the inlet opening 22 is at one lateral side, means is provided for resisting the lateral force on the roller band assembly. This is accomplished by providing a guide rail 52 at each edge of the guideways formed by the inner surface of the bottom wall 15 and top wall 16, as best shown in FIG. 3.

The outlet ports 25 and 26 have a size at least greater than a major portion of the width of the band 38 and, as shown, are nearly as wide as the band 38. Means is provided in the outlet port for supporting the band in the closed position. In the embodiment of FIGS. 1–3, this means is in the form of a plurality of longitudinal ribs 61 and a cross rib 62. The ribs form a grid which supports the band in the desired manner. Preferably, the ribs are recessed 0.01 inch below the surface of the guideway. This recess extends outwardly of the outlet port a slight distance and is shaped to provide a sharp corner 63 with the surface of the guideway. When in the closed position, the band 38 is depressed into the recess and seals against the sharp corner 63. It has been found that the ribs support the band from undue deflection while the sharp corner provides a seal so that the valve does not leak. The band 38 must be resilient enough to aid in this sealing function.

The embodiment of FIGS. 4 and 5 is quite similar to that described above and similar parts have the same reference numeral followed by the postscript prime ('). Two modifications of this embodiment will become apparent. First, the extension 48' is mounted by means of a threaded sleeve 71 which contains an O-ring 72 to seal against the shift rod 36' and thereby isolate the chamber from the hollow valve body. A spring 73 is provided to ordinarily urge the piston 46' toward the position illustrated in FIG. 4. As described above, sufficient fluid pressure may be applied through inlet 49' to move the piston to the right and thereby open outlet port 25' while closing outlet port 26'. A vent opening 74 is provided to vent the spring side of the piston to atmosphere.

The other modification relates to the shape of the supporting grid in the outlet ports. As best shown in FIG. 5, a plurality of smaller openings 76 are provided to communicate the outlet port 26' through the guideway. The areas between the opening 76 define longitudinal and crosswise ribs which operate to support the band 38' in the closed position. A similar arrangement is provided at outlet port 25'.

It is now deemed apparent that the present invention provides apparatus which apply certain features of a roller band device to a valve. The valve outlet opening is at least as wide as a major portion of the width of the band and means is provided in the outlet opening for supporting the band in the closed position. This means is recessed below the adjacent guideway and the recess provides a sharp juncture with the guideway to give a seal against the band. The features can be applied to a two-way or three-way valve for example.

While two embodiments of the present invention have been herein illustrated and described, it is to be understood that this is by way of illustration and not limitation and that the present invention should not be limited except as required by the scope of the appended claims.

I claim:

1. A reciprocating valve comprising, in combination:
   a hollow valve body having inner surfaces defining opposed longitudinal guideways;
   an inlet port communicating with the hollow valve body for feeding fluid thereto;
   an outlet port communicating with the hollow valve body through one of the guideways;
   a flexible, longitudinal, resilient band having end portions affixed to the respective guideways and a central portion disposed in an S-type configuration between the guideways;
   a pair of generally cylindrical roller members each positioned and constrained within one of the open curves of the S-type configuration on opposite sides of the band;
   said guideways providing support for the band as the roller members bear outwardly against the band, and the roller members being constrained thereby to roll in the longitudinal direction only;
   means connected to one of the roller members to move the rollers in the longitudinal direction and move the band between a position closing the outlet port and a position opening the outlet port to permit fluid to flow therethrough;
   the outlet port extending across a major portion of the width of the band;
   a recess extending around the periphery of the outlet port and into which the flexible band is depressed in the closed position;
   a sharp edge between the recess and the guideway at the guideway surface against which the band seals in the closed position; and
   means in the outlet port at about the level of the bottom of the recess for supporting the band in the closed position.

2. A reciprocating valve as set forth in claim 1 including a second outlet port communicating with the hollow valve body through the other guideway and so constructed and arranged that the band closes the first outlet port when the second is opened and vice versa.

3. A reciprocating valve as set forth in claim 1 wherein the last-mentioned means includes at least one rib across the outlet port.

4. A reciprocating valve as set forth in claim 3 where there are a plurality of ribs extending across the outlet port in the longitudinal direction.

5. A valve comprising, in combination:
   a plurality of rotatable members;
   a hollow valve body having a pair of longitudinally extending internal guideways spaced apart a distance less than the sum of the diameters of the rotatable members;
   an inlet port communicating with the hollow valve body for feeding fluid thereto;

an outlet port communicating with the hollow valve body through one of the guideways;

a flexible band supported between the guideways and having a portion disposed between and partially encompassing adjacent rotatable members in a generally S-shaped configuration;

said band having an end portion secured to the valve body adjacent one guideway and another end portion secured adjacent the other guideway;

means urging the rotatable members longitudinally of the valve body to move the band between a position closing the outlet port and a position opening the outlet port to permit fluid flow therethrough; and a recess surrounding the outlet port and having a sharp edge at the guideway surface against which the band seals in the closed position.

6. A valve as set forth in claim 5 including a second outlet port communicating with the hollow valve body through the other guideway and so constructed and arranged that the band closes the first outlet port when the second is opened and vice versa.

7. A valve as set forth in claim 5 wherein the recess is generally parallel to the guideway.

8. A valve as set forth in claim 7 wherein the recess is in the range of about 0.01 to 0.15 inch below the surface of the adjacent guideway.

9. A valve as set forth in claim 8 including means in the outlet port at the level of the recess for supporting the band in the closed position.

10. A valve as set forth in claim 9 wherein the means in the outlet port include a plurality of ribs.

11. A valve including: a hollow valve body having spaced apart guideways; a plurality of rotatable members intermediate the walls and movable longitudinally thereof; said rotatable members having a combined cross-sectional dimension greater than the spacing between the guideways; a flexible band looped in a generally S-shaped configuration about adjacent rotatable members; said band having one end portion secured to the valve body adjacent one guideway and another end portion secured adjacent the other guideway; feed means for feeding fluid under pressure to the hollow valve body; an outlet port communicating with the hollow valve body through one of the guideways; means for moving the rotatable members to move the band across the outlet port to close the same; support means in the outlet port at a level recessed from the adjacent guideway for supporting the band in the closed position; and a recess surrounding the outlet port at about the level of the support means.

12. The combination of claim 11 wherein the level of the support means is parallel to the guideway.

13. The combination of claim 11 wherein the feed means includes an inlet port at one lateral side of the valve body; and including means for providing lateral side support for the band.

14. The combination of claim 13 wherein the means for providing lateral side support includes guide rails at the sides of each guideway.

15. The combination of claim 13 including a second outlet port communicating with the hollow valve body through the other guideway.

16. A three-way valve comprising: a hollow valve body having spaced apart guideways; a pair of rotatable members intermediate the walls and movable longitudinally thereof; the rotatable members having a combined cross-sectional dimension greater than the spacing between the guideways; a flexible band looped in a generally S-shaped configuration about adjacent rotatable members; said band having one end portion secured to the valve body adjacent one guideway and another end portion secured adjacent the other guideway; feed means for feeding fluid under pressure to the hollow valve body; a first outlet port communicating with the hollow valve body through one of the guideways; a second outlet port communicating with the hollow valve body through the other of the guideways; means for moving the rotatable members to selectively move the band across one outlet port to close the same while uncovering the other outlet port to open the same; whereby the valve selectively directs the fluid to one of the outlet ports; a recess surrounding each outlet port; and each recess having a sharp edge at the guideway surface against which the band seals in the closed position.

17. A three-way valve as set forth in claim 16 including means for urging the rotatable members toward an initial position.

18. A three-way valve as set forth in claim 16 wherein the rotatable members have a cylindrical exterior.

19. A three-way valve as set forth in claim 16 wherein the guideways are parallel to each other.

20. A three-way valve as set forth in claim 16 including support means in each outlet port for supporting the band in the closed position.

21. A three-way valve as set forth in claim 16 wherein the feed means includes an inlet port at one lateral side of the valve body; and including means for providing lateral side support for the band.

22. A valve including: a hollow valve body having spaced apart guideways; a plurality of rotatable members intermediate the walls and movable longitudinally thereof; said rotatable members having a combined cross-sectional dimension greater than the spacing between the guideways; a flexible band looped in a generally S-shaped configuration about adjacent rotatable members; said band having one end portion secured to the valve body adjacent one guideway and another end portion secured adjacent the other guideway; an inlet port communicating with the hollow valve body for feeding fluid under pressure thereto; an outlet port communicating with the hollow valve body through said one guideway; means for moving the rotatable members to move the band across the outlet port to close the same; means defining s sharp edge surrounding the outlet port and at the one guideway surface for sealing against the band in the closed position; and support means in the outlet port at a level recessed from the sharp edge and the one guideway surface for supporting the band in the closed position.

23. A valve according to claim 22 in which the inlet port is at one lateral side of the flexible band; and including structure for providing lateral side support for the band.

24. A valve according to claim 23 in which the structure for providing lateral side support for the band includes a guide rail at each side of each guideway.

25. A valve according to claim 22 including a second outlet port communicating with the hollow valve body through the other guideway, and so constructed and arranged that the band closes the first outlet port when the second is opened and vice versa, whereby the valve selectively directs fluid to one of the outlet ports.

26. A valve according to claim 25 including means for urging the rotatable members toward an initial position covering one of the outlet ports.

27. A valve according to claim 25 including means in the second outlet port for supporting the band in the closed position.

28. A valve according to claim 27 including means defining a sharp edge surrounding the second outlet port and at said other guideway surface for sealing against the band in the closed position.

29. A valve including: a hollow valve body having a guideway on the inner surface thereof; an inlet port communicating with the hollow valve body for feeding fluid thereto; an outlet port communicating with the hollow valve body through the guideway; a flexible band disposed within the hollow valve body and having a portion overlying the outlet port in a closed position; means for moving the flexible band between said closed position and a removed position to open the outlet port to permit fluid flow therethrough; and a recess surrounding the outlet port and having a sharp edge at the guideway surface against which the band seals in the closed position.

30. A valve as set forth in claim 29 and including support means in the outlet port at the level of the bottom of the recess for supporting the band in the closed position.

31. A valve as set forth in claim 30 in which the bottom of the recess and the top of the support means are coplanar and parallel to the adjacent guideway.

32. A valve as set forth in claim 31 in which the bottom of the recess is in the range of about 0.01 to 0.15 inch below the surface of the adjacent guideway.

* * * * *